(12) United States Patent
Mohling

(10) Patent No.: US 12,741,746 B2
(45) Date of Patent: Sep. 22, 2026

(54) EJECTION SEAT SEQUENCER TIME CRITICAL DELAY DISTRIBUTION METHODS AND SYSTEM

(71) Applicant: Rockwell Collins, Inc., Cedar Rapids, IA (US)

(72) Inventor: Adam D. Mohling, Swisher, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 18 days.

(21) Appl. No.: 18/775,483

(22) Filed: Jul. 17, 2024

(65) Prior Publication Data

US 2026/0021894 A1 Jan. 22, 2026

(51) Int. Cl.
*B64D 25/10* (2006.01)

(52) U.S. Cl.
CPC .................................... *B64D 25/10* (2013.01)

(58) Field of Classification Search
CPC .................................. B64C 1/32; B64D 25/10
See application file for complete search history.

(56) References Cited

U.S. PATENT DOCUMENTS 3,706,434 A * 12/1972 Martin .................. B64D 25/10 244/122 AD
4,673,147 A * 6/1987 Solomonides ......... B64D 25/10 244/122 A
5,222,695 A * 6/1993 Lake ...................... B64D 25/10 244/122 AE
11,390,389 B2 * 7/2022 Dunst ................ G05B 19/0428
11,608,183 B2 * 3/2023 Wilson ................... B64D 25/10
2017/0297725 A1 * 10/2017 Campbell ............. B64D 25/10

* cited by examiner

*Primary Examiner* — Justin M Benedik
(74) *Attorney, Agent, or Firm* — Millen, White, Zelano & Branigan P.C.; William F. Nixon

(57) ABSTRACT

An ejection seat includes an ejection seat sequencing system. The sequencing system enables time delays to various components of the system, such the drogue parachute, the main parachute, and harness release cartridge. A sequence controller receives data for a parameter, such as airspeed, from at least two sensors. The sequence controller selects a sequence timing delay mode to implement the time delays for the components of the sequencing system. The sequence controller also accesses a lookup table in a database accessible by the sequence controller. The sequence controller uses a delay parameter of the lookup table to modify a time delay within the sequence timing delay mode, as configured by a user.

20 Claims, 9 Drawing Sheets

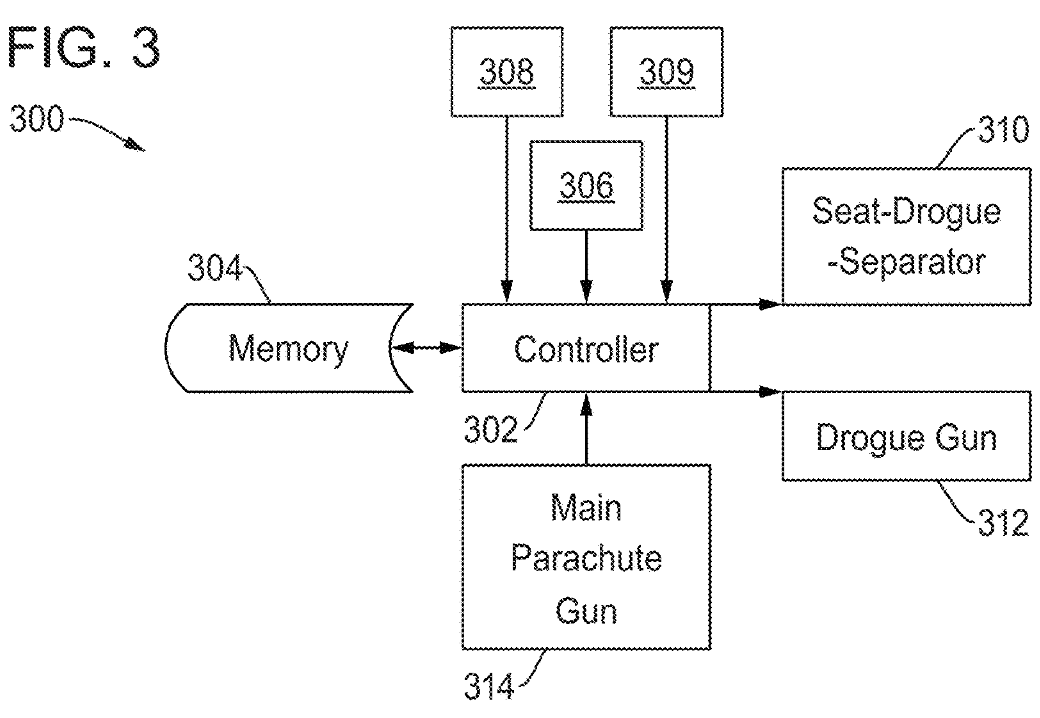
FIG. 3
300
308
309
306
310
Seat-Drogue -Separator
304
Memory
Controller
302
Drogue Gun
312
Main Parachute Gun
314

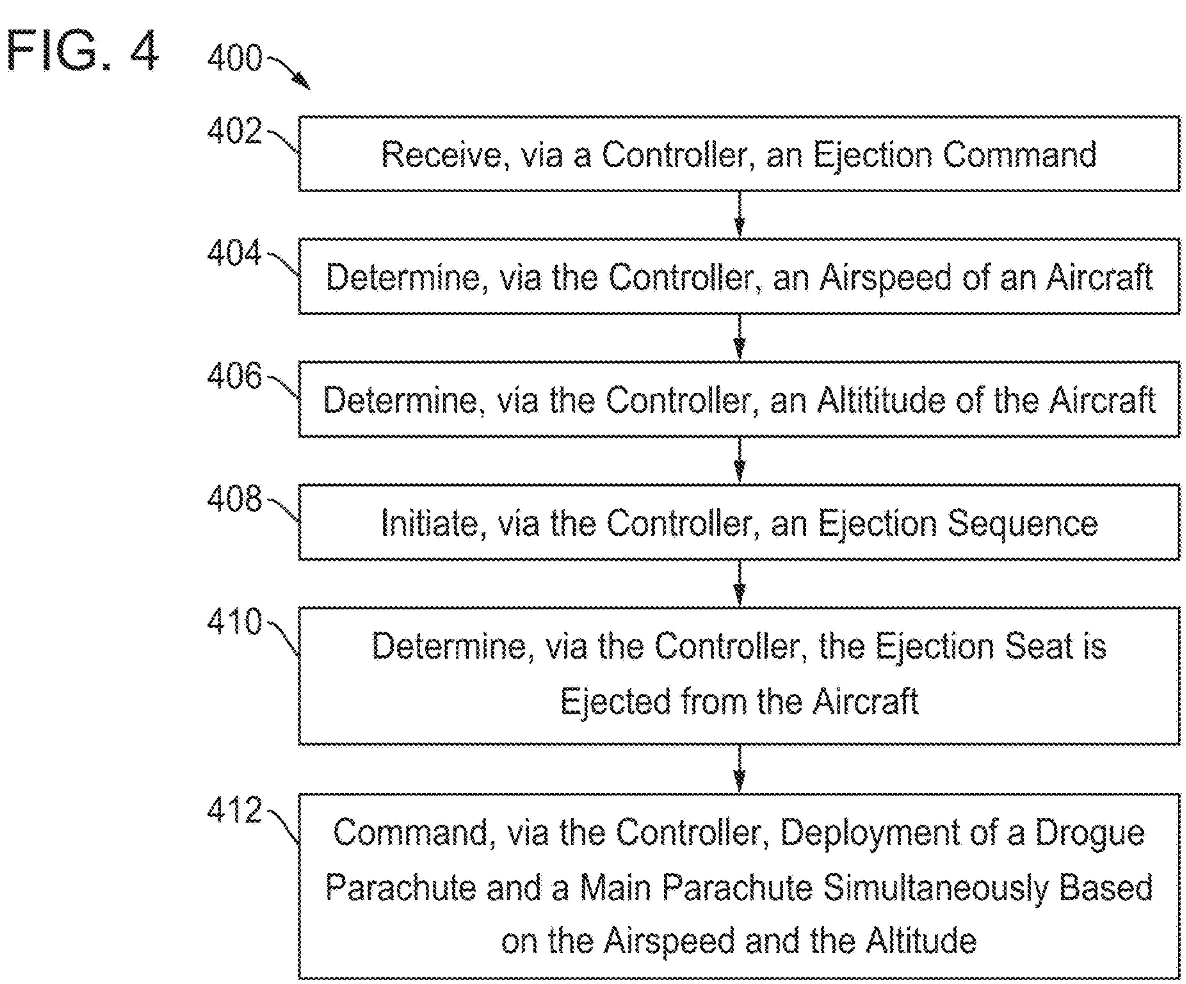
FIG. 4
400
402
Receive, via a Controller, an Ejection Command
404
Determine, via the Controller, an Airspeed of an Aircraft
406
Determine, via the Controller, an Altititude of the Aircraft
408
Initiate, via the Controller, an Ejection Sequence
410
Determine, via the Controller, the Ejection Seat is Ejected from the Aircraft
412
Command, via the Controller, Deployment of a Drogue Parachute and a Main Parachute Simultaneously Based on the Airspeed and the Altitude 600
604
602
Altitude (ft.)
Airspeed (KEAS)
12,000
16,000
14,000
12,000
10,000
8000
6000
4000
2000
0
0
100
200
300
400
500
600
607
609
611
613
615
617
619
621
623
650C
650A
650B
626
624
622
618
616
614
625C
612
625A
610
625B
608
606

524 724 726 728 730 732 734 736

| Mode | Drogue | STAPAC | Divergence Thruster | Parachute Mortar | First Drogue Severance Cutter | Second Drogue Severance Cutter | Harness Release Cartridge |
|---|---|---|---|---|---|---|---|
| 606 | Invalid | 15 | 46 | 32 | 182 | 192 | 282 |
| 608 | Invalid | 15 | 46 | 32 | 182 | 350 | 282 |
| 610 | Invalid | 15 | 46 | 32 | 400 | 450 | 500 |
| 612 | 0 | 15 | 46 | 32 | 500 | 550 | 700 |
| 614 | 0 | 15 | 46 | 100 | 600 | 700 | 1000 |
| 616 | 0 | 15 | 46 | 150 | 700 | 1000 | 1111 |
| 618 | 0 | 15 | 46 | 159 | 1150 | 1160 | 1250 |
| 620 | 0 | 15 | 46 | 300 | 1150 | 1160 | 1250 |
| 622 | 0 | 15 | 46 | 400 | 1200 | 1160 | 1250 |
| 624 | 0 | 15 | Invalid | 600 | 1300 | 1160 | 1250 |
| 626 | 0 | 15 | Invalid | 800 | 1350 | 1160 | 1350 |

FIG. 7A

EJECTION SEAT SEQUENCER TIME CRITICAL DELAY DISTRIBUTION METHODS AND SYSTEM

This invention was made with Government support under FD2020-23-51087 awarded by the United States Air Force. The Government has certain rights in the invention.

FIELD OF THE INVENTION

The subject matter disclosed herein relates to ejection seat systems using time delays. More particularly, the subject matter disclosed herein relates to ejection seat systems that provide scalable configuration features for the time delays.

BACKGROUND OF THE INVENTION

Ejection seats, also known as sequencers, implement more than just a decision to jettison the aircraft. Sequencers implement a precise timing sequence that occurs for achieving a safe and successful ejection. Several factors may influence the evaluation of this timing. Air pressure may be the dominant factor or input value that feeds the timing sequence. Air pressure is influenced by an aircraft's altitude and air speed. The higher the altitude results in lower air pressure. The higher the aircraft's velocity, the higher the air pressure. Based on these characteristics, the sequencer makes a timing decision when to fire the serial Electro-Explosion Devices (EEDs) of the ejection seat.

It may be appreciated for a solution to evolve from discrete modes and arbitrary boundaries for controlling time delay values for sequencers.

SUMMARY OF THE INVENTION

The present disclosure is directed, in a first embodiment, to a method for performing an ejection seat sequence. The method includes initiating an ejection sequence for an ejection seat of an aircraft. The ejection seat includes an ejection seat sequencing system. The method also includes determining at least two values for a parameter using at least two sensors. The method also includes determining a plurality of sequence timing delay modes based on the at least two values at a sequence controller. Each sequence timing delay mode includes a time delay for a component of the ejection seat sequencing system for the ejection seat. The method also includes selecting a sequence timing delay mode of the plurality of sequence timing delay modes at the sequence controller. The method also includes accessing a lookup table accessible by the sequence controller. The method also includes retrieving a value for a delay parameter in the lookup table. The method also includes implementing the time delay for the selected sequence time delay mode based on the delay parameter.

In yet another embodiment, the present disclosure is directed to an ejection seat sequencing system for an ejection seat of an aircraft. The ejection seat sequencing system includes a sequence controller to issue time delay commands to at least one component. The ejection seat sequencing system includes a database coupled to the sequence controller. The database includes a lookup table. The sequence controller includes a processor coupled to a memory. The memory includes instructions that, when executed on the processor, configures the sequence controller to perform the operations of initiating an ejection sequence for the ejection seat. The operations also include determining at least two values for a parameter using at least two sensors. The operations also include determining a plurality of sequence timing delay modes based on the at least two values at the sequence controller. Each sequence timing delay mode includes a time delay for the at least one component of the ejection seat sequencing system. The operations also include selecting a sequence timing delay mode of the plurality of sequence timing delay modes of the sequence controller. The operations also include accessing the lookup table accessible by the sequence controller. The operations also include retrieving a value for a delay parameter in the lookup table. The operations also include implementing the time delay for the selected sequence time delay mode based on the delay parameter.

In yet another embodiment, the present disclosure is directed to a non-transitory computer-readable medium having stored thereon processor-executable instructions for performing operations. The operations include initiating an ejection sequence for an ejection seat of an aircraft. The ejection seat includes an ejection seat sequencing system. The operations also include determining at least two values for a parameter using at least two sensors. The operations also include determining a plurality of sequence timing delay modes based on the at least two values at a sequence controller. Each sequence timing delay mode includes a time delay for a component of the ejection seat sequencing system for the ejection seat. The operations also include selecting a sequence timing delay mode of the plurality of sequence timing delay modes at the sequence controller. The operations also include accessing a lookup table accessible by the sequence controller. The operations also include retrieving a value for a delay parameter in the lookup table. The operations also include implementing the time delay for the selected sequence time delay mode based on the delay parameter.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

FIG. 3 illustrates a schematic block diagram of a control system for the ejection seat sequencing system according to the disclosed embodiments.

FIG. 4 illustrates a flowchart of a process performed by the control system of the ejection seat sequencing system for the ejection seat according to the disclosed embodiments.

FIG. 7A illustrates an example lookup table according to the disclosed embodiments.

DETAILED DESCRIPTION OF THE INVENTION

Figure 1:
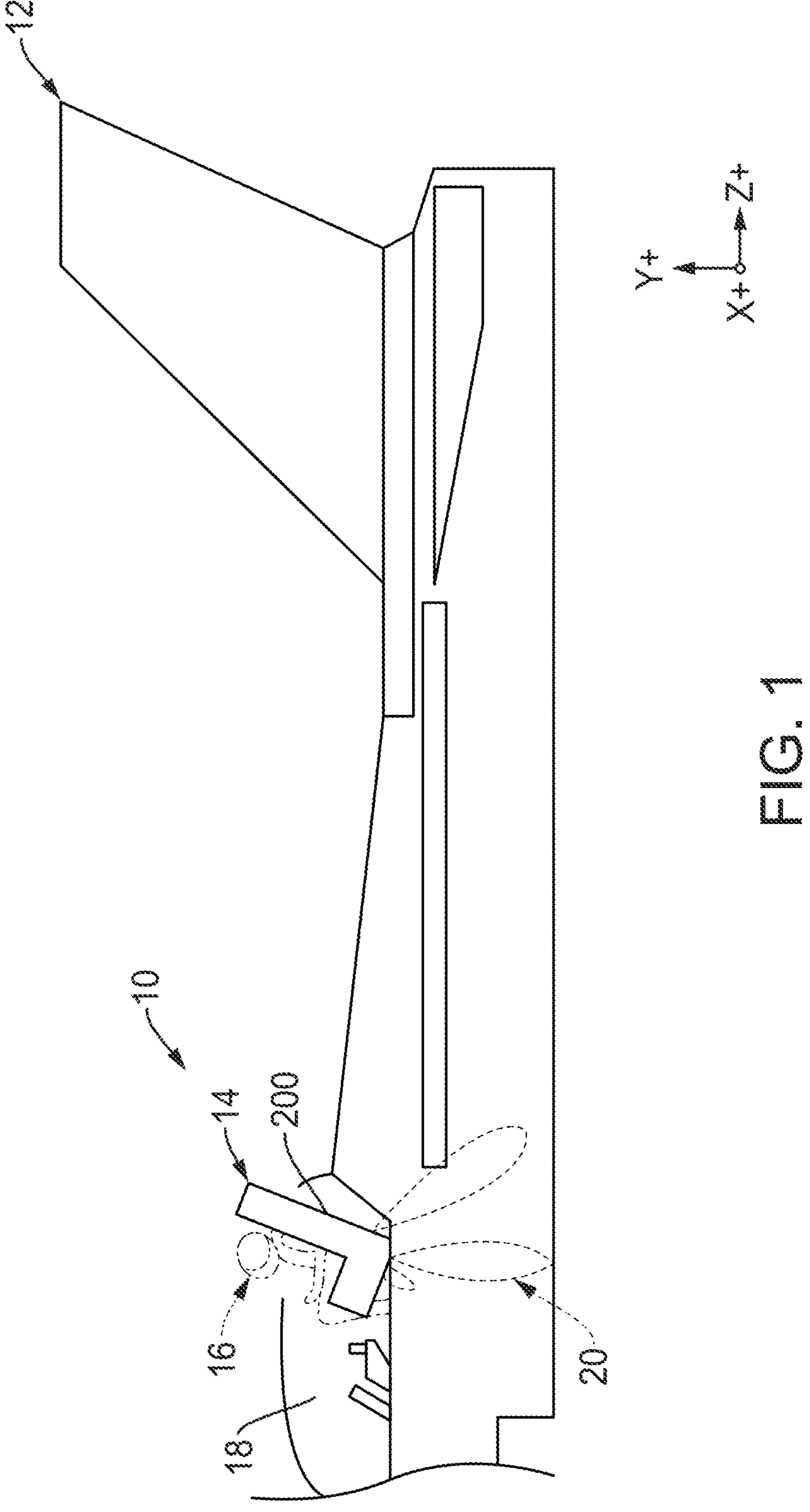
FIG. 1 illustrates an aircraft having an aircraft ejection system according to the disclosed embodiments.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

As used herein, a letter following a reference numeral is intended to reference an embodiment of the feature or element that may be similar, but not necessarily identical, to a previously described element or feature bearing the same reference numeral, such as 1, 1*a*, or 1*b*. Such shorthand notations are used for purposes of convenience only, and should not be construed to limit the inventive concepts disclosed herein in any way unless expressly stated to the contrary.

Moreover, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant disclosed concepts. This is done merely for convenience and to give a general sense of the disclosed concepts, and "a" and "an" are intended to include one or at least one and the singular also includes plural unless it is obvious that it is meant otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

As used herein, any reference to "one embodiment," "alternative embodiments," or "some embodiments" means that particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the disclosed concepts disclosed may include one or more of the features expressly described or inherently present herein, or any combination or sub-combination of two or more such features, along with any other features that may not necessarily be expressly described or inherently present in the instant disclosure.

The disclosed embodiments may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The present disclosure is directed to a heatmap or a bell curve approach that would provide the sequencer with scaled input with a weighting and moving average. A look-up table is provided for the EED delays in conjunction with the ability to have a weight-rank voting system. The system is enabled to have increased control, flexibility, and overall safety. Instead of considering "modes," the disclosed embodiments provide a ranking of acceptable delay, then support for acceptable deployments where lower harsh outcomes may be achieved.

The binary approach to parachute sub-system deployment, usually bifurcated along an equivalent airspeed and altitude mode boundary line or curve, may result in a harsh cut-over between deployment modes. In particular, a higher end of the lower speed/altitude mode lacks a drogue stabilization and deceleration phase and can have high main recovery parachute opening shock loads resulting in a higher probability of injury. This trade-off historically has been made in favor of biasing for improved terrain clearance performance, such as the ability to recover the occupant when ejecting with a low clearance to ground level at the time of ejection.

The disclosed embodiments allow a user to configure a delay table using parameters to provide a greater degree of variability. All the delay parameters may trend upward. By using a distributed delay table, the disclosed embodiments may provide better control over the resultant execution of the sequencer. The resolution control provides a process with increased precision and results in the safest decision to be selected by default.

Use of a distributed delay table may allow for configurable delays that are loadable in the factory or service/maintenance area that are customizable per platform. Certification costs would be reduced because the voting software would not need to change as it is merely measuring air pressure and publishing a "ranked" answer. The ranked value is used as the offset into the precomputed lookup table. The claimed approach provides better control over timing delays that an end user, or pilot, would experience when on the edge of a decision-making boundary between current modes. The disclosed embodiments allow for a gradual transition of variable delays versus the current aggressive stair-stepped approach.

FIG. 1 depicts an aircraft 12 having an aircraft ejection system 10 according to the disclosed embodiments. Aircraft ejection system 10 may be installed in aircraft 12 to expel an ejection seat 14 and an occupant from a cockpit 18 of the aircraft. Ejection seat 14 may be urged from cockpit 18 by a propulsion system 20. In some embodiments, ejection seat 14 includes an ejection seat sequencing system 200. Ejection seat sequencing system 200 may be configured to initiate a sequence of ejection events after ejection seat 14 is expelled from aircraft 12.

Figure 2:
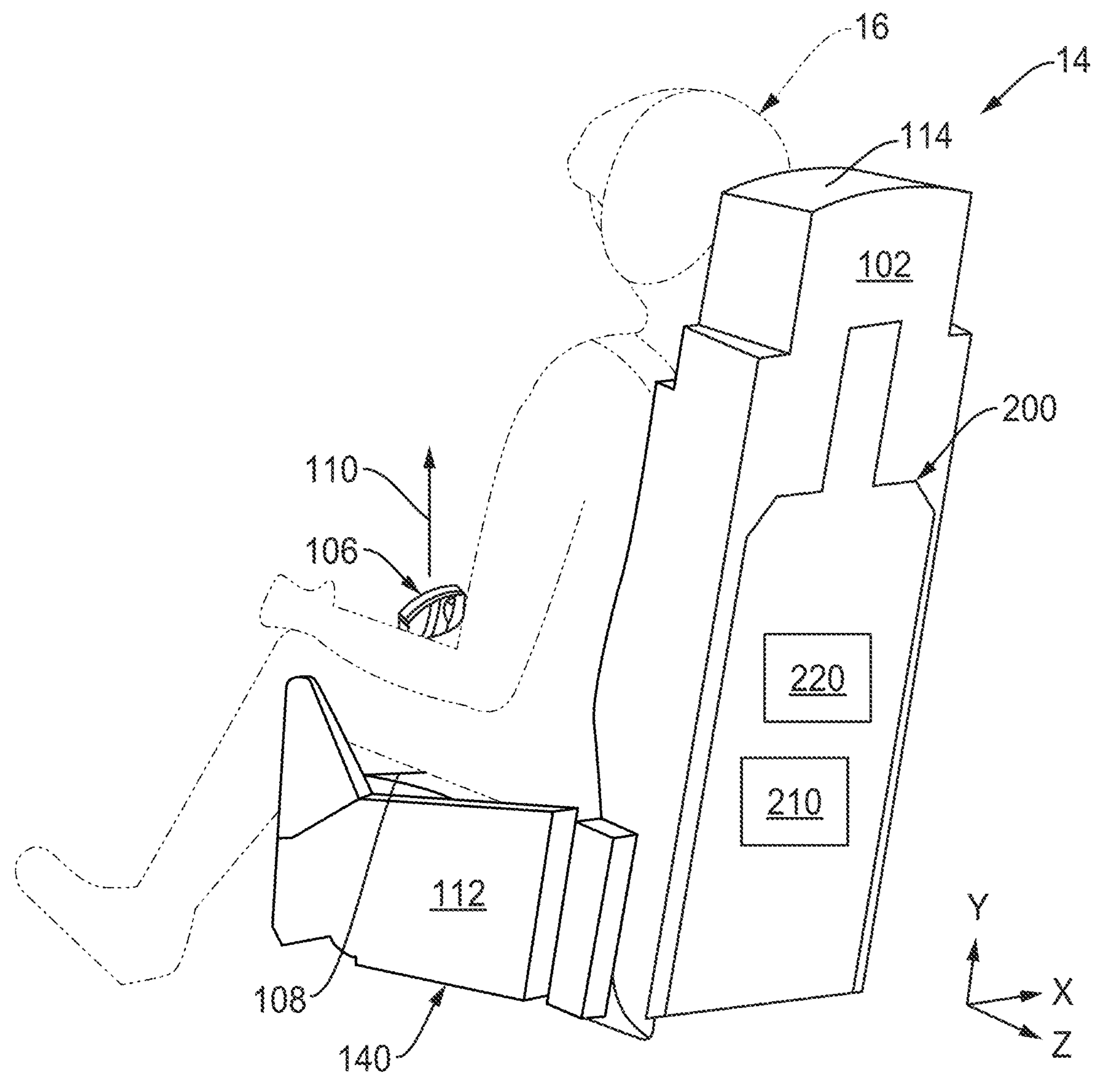
FIG. 2 illustrates an ejection seat having an ejection seat sequencing system according to the disclosed embodiments.

FIG. 2 depicts an ejection seat 14 having an ejection seat sequencing system 200 according to the disclosed embodiments. Ejection seat 14 includes a seat back 102 and a seat bucket 104. Ejection seat sequencing system 200 includes a drogue parachute 210 and a main parachute 220 that are stowed in or on ejection seat 14 during normal operations, such as in or on seat back 102, seat bucket 104, and the like. In some embodiments, an ejection handle 106 may be located proximate a front 108 of seat bucket 104. Front 108 of seat bucket 104 may be opposite, or distal, seat back 102. While FIG. 2 shows ejection handle 106 located at front 108 of seat bucket 104, in some embodiments, ejection handle 106 may located anywhere that is accessible to occupant 16 of ejection seat 14. For example, ejection handle 106 may be located on a side or multiple sides 112 of seat bucket 104 or a headrest 114 of seat back 102.

Ejection handle may be configured to initiate an ejection sequence upon actuation. For example, occupant 16 pulls ejection handle 106 in direction 110. This action may activate a rocket catapult assembly coupled to seat back 102 of ejection seat 14. In response to the activation, a catapult cartridge unit may ignite and produce a relatively hot, high pressure gas. A breach may be coupled to aircraft 12 and include a mortar tube disposed within the mortar assembly of the rocket catapult assembly. In some embodiments, the mortar cap assembly may direct a first portion of gas to the breach tending thereby to drive the mortar tube outward of the mortar assembly to cause ejection seat 14 to be expelled from cockpit 18.

In some embodiments, upon ejection, drogue parachute 210 or main parachute 220 are deployed in a predetermined sequence. In additional embodiments, the predetermined sequence is based on an altitude of aircraft 12 at a time of ejection and a speed of ejection seat 14 at a time of deployment. In this regard, the sequence may be determined based on static pressure data and dynamic pressure data in accordance with various embodiments.

Referring to FIG. 3, a schematic block diagram of a control system 300 for ejection seat sequencing system 200 is disclosed. Control system 300 includes a sequence controller 302 in electronic communication with a plurality of sensors 306, 308, and 309. In some embodiments, sequence controller 302 may be integrated into a computer system of ejection seat 14. In other embodiments, sequence controller 302 may be configured as a central network element or hub to access various systems and components of control system 300.

In some embodiments, sequence controller 302 may be implemented as a single processor. In other embodiments, sequence controller 302 may be implemented as and may include one or more processors or one or more tangible, non-transitory memories, such as memory 304, and be capable of implementing logic. Each processor may be a general purpose processor, a digital signal processor (DSP), an application specific integrated circuit (ASIC), a field programmable gate array (FPGA), or or other programmable logic device, discrete gate or transistor logic, discrete hardware components, and any combination thereof. Sequence controller 302 may include a processor configured to implement various logical operations in response to execution of instructions, for example, instructions stored on a non-transitory, tangible, computer-readable medium, such as memory 304, configured to communicate with sequence controller 302.

In some embodiments, sequence controller 302 may be an electronic communication with sensors 306, 308, and 309. Sensors 306, 308, and 309 may be disposed on a wing of aircraft 12, on the container for parachute 220 of ejection seat 14, and the like. For example, sensor 306 may comprise a static pressure sensor, such as an altimeter, a barometer, or any other sensor configured for us in determining an altitude of aircraft 12. In some embodiments, sensor 308 may include a dynamic pressure sensor, such as one to capture data to be used with the static pressure data of sensor 306 for airspeed calculation, an optical sensor such as a light detection and ranging (LiDAR) sensor, a photonic sensor, and the like. In some embodiments, sensor 309 may be a sensor to measure the flow velocity of air, such as a pitot sensor. Sensor 309 may be used to measure the airspeed of aircraft 12. Based on the variable data captured by sensors 306, 308, and 309 and receiving an ejection command, sequence controller 302 may initiate a sequence of ejection events as disclosed herein.

Control system 300 of ejection seat sequencing system 200 also includes a seat-drogue-separator 310, a drogue gun 312, and a main parachute gun 314. Drogue gun 312 may be known as a drogue gun, rocket, mortar, and the like. Main parachute gun 314 may be known as a mortar. Drogue gun 312 is configured to deploy drogue parachute 210 from ejection seat 14 from a stowed state, as shown in FIG. 2, to a deployed state. Similarly, main parachute gun 314 is configured to deploy main parachute 220 from stowed state to a deployed state.

Seat-drogue-separator 310 is configured to deploy drogue parachute 210 from ejection seat 14 during an ejection event. In some embodiments, seat-drogue-separator 310 may include any known separation mechanism, such as a guillotine, a release latch, a shape charge, and the like. In response to the ejection command, or any other reference control signal indicating an ejection event is occurring on ejection seat 14, and based on at least two variables from sensors 306, 308, and 309, sequence controller 302 may perform a time critical delay distribution process as disclosed below.

FIG. 4 depicts a flowchart 400 of a process performed by control system 300 of ejection seat sequencing system 200 for ejection seat 14 according to the disclosed embodiments. Flowchart 400 may refer to FIGS. 1-3 for illustrative purposes. Flowchart 400, however, are not limited by the embodiments disclosed in FIGS. 1-3.

Step 402 executes by receiving, via sequence controller 302, an ejection command. The ejection command may be received in response to an ejection handle 106 of ejection seat 14 being pulled, such as in direction 110. In response to receiving the ejection command, flowchart 400 may make some preliminary determinations in order to determine an appropriate ejection sequence.

For example, flowchart 400 also executes step 404 by determining, via sequence controller 302, an airspeed of aircraft 12. Alternatively, step 404 may determine the airspeed of ejection seat 14. The airspeed may be determined based on sensor data received from one or more of sensors 306, 308 and 309. In some embodiments, airspeed may be calculated based on a pressure differential in response to one or more sensors being a dynamic/static pressure sensor. In other embodiments, one or more sensors may be pitot sensors.

Step 406 executes by determining, via sequence controller 302, an altitude of aircraft 12 or ejection seat 14. The altitude may be determined based on sensor data from one or more sensors 306, 308, and 309. For example, sensor 306 may include a static pressure sensor configured to measure static pressure proximate aircraft 12. In response to receive static pressure data, sequence controller 302 may determine an equivalent altitude of aircraft 12.

Step 408 executes by initiating, via sequence controller 302, an ejection sequence. The ejection sequence may include igniting a catapult cartridge unit to initiate a rocket catapult assembly to eject ejection seat 14 out of cockpit 18 and aircraft 12. Step 410 executes by determining, via sequence controller 302, that ejection seat 14 is ejected from aircraft 12. Sequence controller 302 may determine ejection has occurred based on a predetermined time elapsing from the ejection command received in step 402, based on receiving a reference signal, such as from a non-contact sensor or the like just prior to ejection.

Step 412 executes by commanding, via sequence controller 302, deployment of drogue parachute 210 and main parachute 220 simultaneously based on the airspeed and the altitude according to the embodiments disclosed below. In some embodiments, "simultaneously" may refer to as being within 150 milliseconds, or within 125 milliseconds, or within 100 milliseconds. Deployment of drogue parachute 210 and main parachute 220 may occur upon separation of ejection seat 14 from aircraft 12. Separation from aircraft 12 by ejection seat 14 may be determined based on a time elapsing from the ejection command received in step 402, based on sensors disposed on ejection seat 14 providing sensor data to sequence controller 302, for example.

In some embodiments, drogue parachute 210 may be deployed slightly before main parachute 220. Main parachute 220, however, may still be deployed within the simultaneous range disclosed above in response to drogue parachute 210 being deployed slightly beforehand. In other embodiments, drogue parachute 210 may be made inoperative.

The disclosed embodiments supplement the process disclosed by flowchart 400 by providing sequence controller 302 with additional processes to provide control system 300 with scaled input with weighting and moving average. In known systems, modes may be used. Thresholds are used to define the different modes, which invoke different values for the timing delays used by ejection seat sequencing system 200. For example, crossing the threshold from Mode 1 to Mode 2*a* in such a system may result in almost a full second of delay before deploying main parachute 220. Given the potential speed of 250 Knots Equivalent Air Speed (KEAS), such a delay could result in a distance traveled of 422 feet, or about 129 meters. The disclosed embodiments provide the ability to increase the resolution to achieve a more flexible and overall favorable outcome.

Figure 5A:
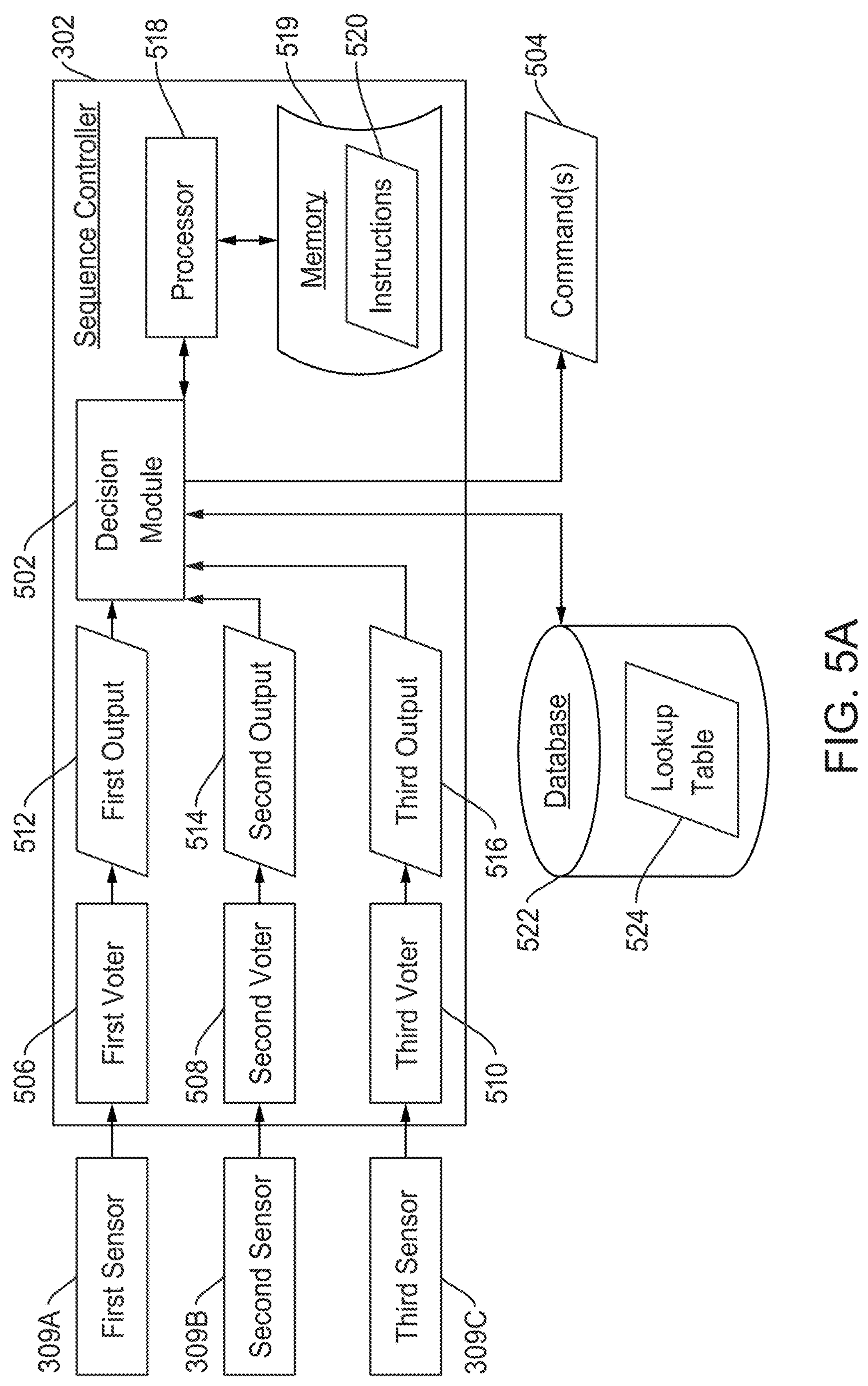
FIG. 5A illustrates a block diagram of components to operate the control system of the ejection seat sequencing system according to the disclosed embodiments.

FIG. 5A depicts a block diagram of components to operate control system 300 of ejection seat sequencing system 200 according to the disclosed embodiments. Sequence controller 302 is disclosed in greater detail along with other components of ejection seat sequencing system 200. Sequence controller 302 receives data and information to generate one or more commands 504 to other components in control system 300, such as seat-drogue-separator 310, drogue gun, 312, or main parachute gun 314. Sequence controller 302 may provide commands to other components in ejection seat sequencing system 200, such as performed in step 412 disclosed above.

Figure 5B:
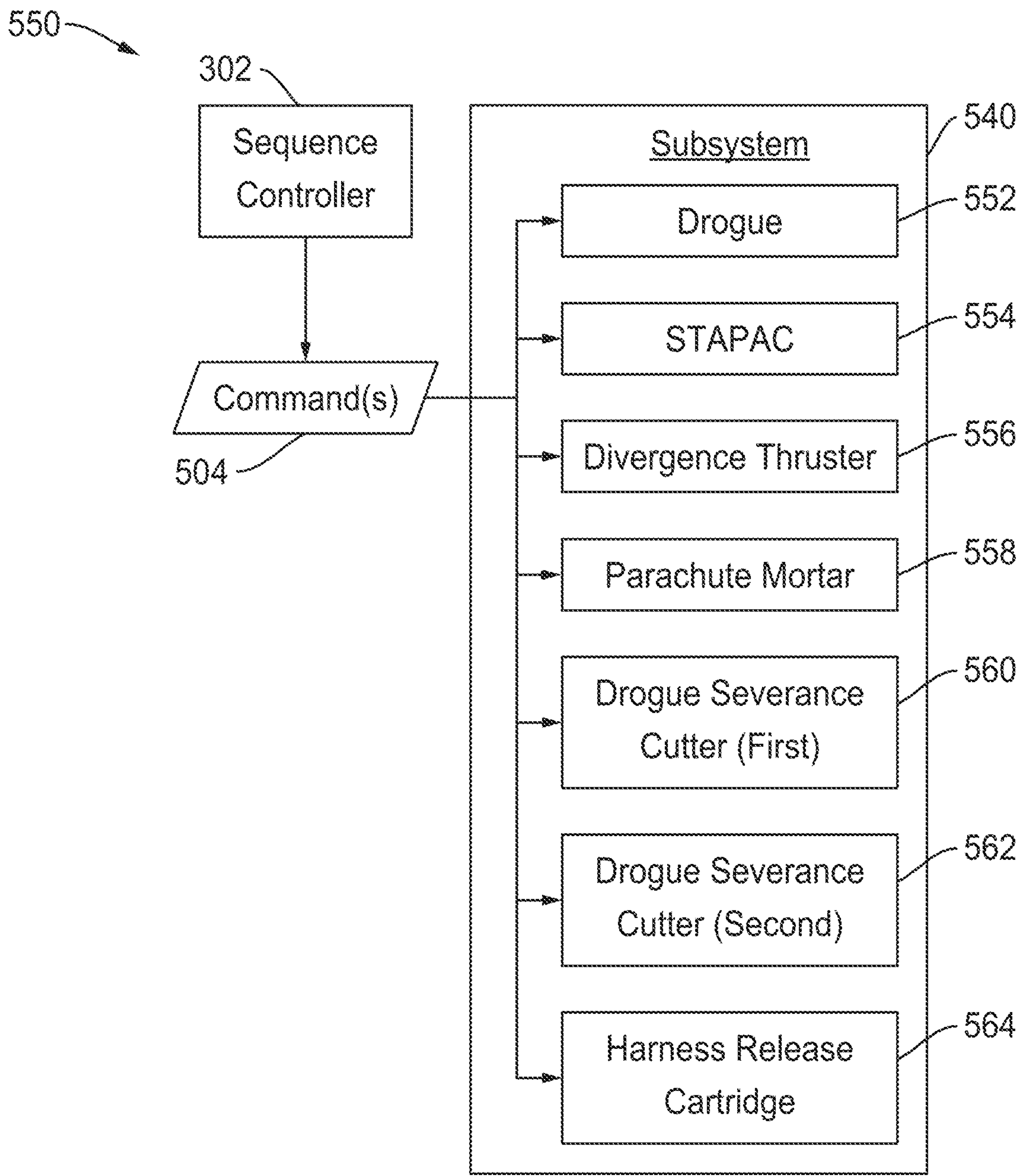
FIG. 5B illustrates a block diagram of components within an alternate ejection seat sequencing system according to the disclosed embodiments.

For example, FIG. 5B depicts a block diagram of components within a subsystem 540 an alternate ejection seat sequencing system 550 according to the disclosed embodiments. Alternate ejection seat sequencing system 550 may operate in conjunction with ejection seat 14, disclosed above. Commands 504 issued by sequence controller 302 drive the delay values between firings or engagements of the components within subsystem 540. Subsystem 540 may fire or engage its components according to delays in a specific order.

Subsystem 540 includes drogue 552, which is similar to drogue parachute 210 disclosed above. Drogue parachute 210 may be deployed before main parachute 220 to stabilize ejection seat 14. It may stabilize ejection seat orientation and slow down the descent rate to manage descent until main parachute 220 is deployed. Drogue 552 may implement a mortar, or gun, to initiate deployment.

Subsystem 540 also includes STAPAC 554. STAPAC 554 may refer to an advanced rocket motor and stability package of alternate ejection seat sequencing system 550 that compensates to pitch changes due to varied aircrew weight and aerodynamic effects. STAPAC 554 may reduce the risk of injury to aircrew within ejection seat 14. It may stabilize and correct for the pitch axis of the seat during an ejection sequence, especially at a low altitude or a slow airspeed.

Subsystem 540 also includes divergence thruster 556. Divergence thruster 556 helps separate aircrew from ejection seat 14 after ejection. Divergence thruster 556 may create a force that pushes the occupant away from ejection seat 14, thereby preventing any potential entanglement or collision between the occupant and ejection seat 14. This feature provides for proper deployment of drogue parachute 210 and main parachute 220.

Subsystem 540 also includes parachute mortar 558, which is similar to parachute gun 314 disclosed above. Parachute mortar 558 may deploy a small explosive charge or propellant system to rapidly deploy the parachute canopy of main parachute 220. Parachute mortar 558 may eject main parachute 220 from a container at high speed. This feature allows the canopy to inflate rapidly.

Subsystem 540 also includes first drogue severance cutter 560 to release or separate drogue parachute 210 from ejection seat 14. First drogue severance cutter 560 to release a first bridgewire for drogue parachute 210. This feature ensures drogue parachute 210 does not interfere with the operation of main parachute 220 during the ejection sequence. First drogue severance cutter 560 may be a small explosive charge or a mechanical cutter located in ejection seat 14. Second drogue severance cutter 562 may perform the same operations, except for a different bridgewire.

Subsystem 540 also includes harness release cartridge 564. Harness release cartridge 564 facilitates separation of the occupant from ejection seat 14 during the ejection sequence. It may be a small explosive device located in ejection seat 14 to sever the connections or release mechanisms of the harness system of ejection seat 14. The harness straps are released or severed by harness release cartridge 564 to separate the occupant from ejection seat 14.

As may be appreciated, the components of subsystem 540 may be deployed in an order. That order may be drogue 552, STAPAC 554, divergence thruster 556, parachute mortar 558, first drogue severance cutter 560, second drogue severance cutter 562, and harness release cartridge 564. Delays may occur between the initiation of the deployment of each component. These delays are dependent on parameters detected by sensors 306, 308, and 309. Commands 504 may provide the instructions to subsystem 540 for the delays based on a "mode" determined by sequence controller 302.

Modes may refer to scenarios for the proper ejection sequence deployment depending on the parameters detected for ejection seat sequencing system 200. Once the mode is determined, sequence controller 302 can generate commands 504. For example, commands 504 may instruct drogue 552 to be inoperative in some modes. Same with divergence thruster 556. Delays for other parachute mortar may range from 32 milliseconds (ms) to 1200 ms. Delays for first drogue severance cutter 560 may range from 182 ms to 1350 ms. Delays for second drogue severance cutter 562 may range from 192 ms to 1360 ms. Delays for harness release cartridge 564 may range from 282 ms to 1450 ms. With such a wide range of potential delays for each component, different modes are determined for the sequencing of deployment.

Figure 6:
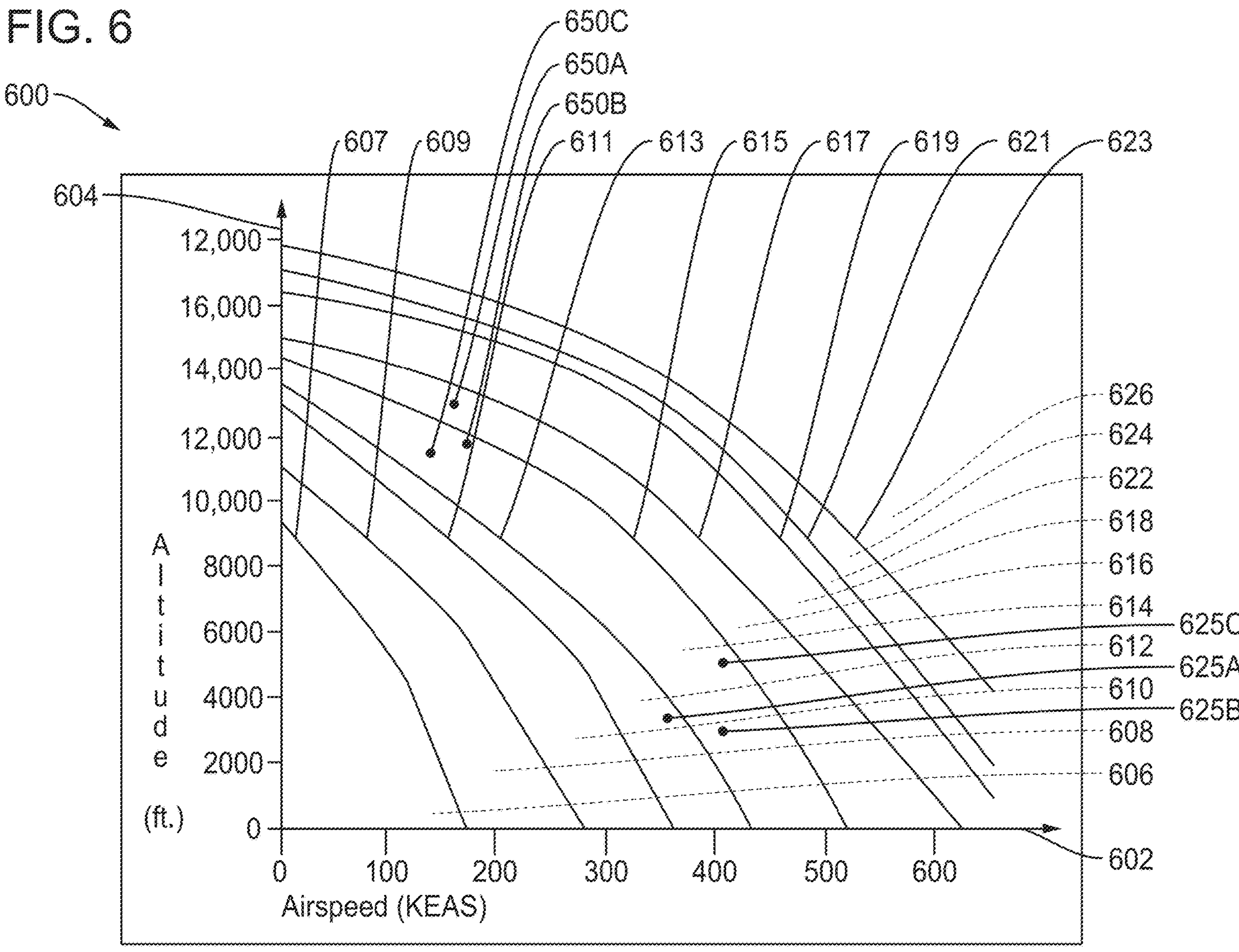
FIG. 6 illustrates a chart showing a plurality of modes according to the disclosed embodiments.

FIG. 6 depicts a chart 600 showing a plurality of modes 606-626 according to the disclosed embodiments. Chart 600 includes axis 602 for airspeed (KEAS) and axis 604 for altitude. These may be parameters provided to sequence controller 302. The airspeed and altitude of aircraft 12 or ejection seat 14 may be determined using one or more sensors 306, 308, or 309. Depending on the detected parameters, a mode may be selected in which to enable delays specific to each mode for the components of subsystem 540.

For example, mode 606 may be enabled for detecting airspeed values of about 175 KEAS and below about an altitude of 9900 ft. Mode 606 may have a set of delays for each component of subsystem 540 in the order disclosed above. For drogue 552, it may be made inoperative. Mode 606 may be used for scenarios of a lower airspeed and a lower altitude. A curve 607 may separate mode 606 from mode 608. For values in mode 608, the delays for the components may stay the same or increase, or, in the case of drogue 552, the component may be made operative. Curve 609 separates mode 608 from mode 610. Mode 610 also may have higher delay values for at least one component of subsystem 540 than mode 608.

This relationship may continue between the different modes shown in FIG. 6. Mode 610 may be separated from mode 612 by curve 611. Mode 612 may be separated from mode 614 by curve 613. Mode 614 may be separated from mode 616 by curve 615. Mode 616 may be separated from mode 622 by curve 617. Mode 622 may be separated from mode 624 by curve 621. Mode 624 may be separated from mode 626 by curve 623. In each instance, the higher mode having greater values for airspeed or altitude will increase at least one delay time or make operative for at least one component of subsystem 540.

Curves 607-623 provide the dividing borders between modes where delay times in the sequencing process or the operative status of components change from one mode to the next. Thus, the delay time for a component may increase or its status change. For example, the delay time for first drogue severance cutter 560 may increase from 1330 ms to 1350 ms when moving from mode 624 to mode 626. Some of these differences in time delay may be significant. Thus, the disclosed embodiments provide sequence controller 302 with an approach that allows scaled input for increased flexibility is determining the time delays for the components in subsystem 540, as provided by commands 504.

Referring back to FIG. 5A, sensors 309A, 309B, and 309C may be pitot sensors. They may be located on different locations on aircraft 12 or ejection seat 14 to measure airspeed of the object. Pitot sensors provide these airspeed values to voters within sequence controller 302. For example, first sensor 309A provides a first airspeed value to first voter 506 to generate first output 512. Second sensor 309B provides a second airspeed value to second voter 508 to generate second output 514. Third sensor 309C provides a third airspeed value to third voter 510 to generate third output 516. Voters 506, 508, and 510 also may receive parameters for altitude or other attributes to determine outputs 512-516. The results of each output may be mapped to a mode shown in FIG. 6. Thus, each voter executes an algorithm to determine which mode should be implemented by sequence controller 302.

As may be appreciated, the number of sensors may be one, two, three, or more. The corresponding number of values is provided to sequence controller 302 through the corresponding number of voters. In some embodiments, two sensors 309A and 309B are disclosed that provide two airspeed values using first voter 506 and second voter 508. Sequence controller 302 may use the first output 512 and second output 514 to decide with mode to select. Further, the disclosed embodiments may emphasize safety in that the mode having the better delays to reduce the chance of injury to the occupant of the seat. In such embodiments, even if one mode is represented by two data points and the safer mode is represented by one data point, decision module 502 may be programmed to select the safer mode.

For example, referring to FIG. 6, data points 650A, 650B, and 650C are shown. First voter 512 receives parameters for data point 650A. It uses these parameters of airspeed and altitude to select mode 614 with first output 512. Second voter 514 receives parameters for data point 650B and selects mode 614 with second output 514. It may be seen that data point 650B is closer to curve 615 than data point 650A. Third voter 516 receives parameters for data point 650C and selects mode 616 with third output 516. Thus, the voters differ on which mode to use in determining the delay sequences for alternate ejection seat sequencing system 550.

Decision module 502 receives the outputs from the voters to make a determination which mode to select in order to issue commands for the timing delays corresponding to the selected mode. For example, two selections of mode 614 would outweigh a single selection of mode 616. As may be appreciated, decision module 502 may receive outputs from more than three voters, such as five, seven, and the like. Decision module 502 may rank or weigh each output and select a mode for the ejection seat sequencing. It then may issue commands 504 to enable the selected mode. The disclosed embodiments, however, may modify this ranking system according to lookup table 524 in database 522. This feature is disclosed in greater detail below.

Decision module 502 may be enabled by one or more processors 518 within sequence controller 302. Processor 518 is coupled to memory 519, which stores instructions 520. In some embodiments, memory 519 may be memory 304, disclosed above. Instructions 520 configure processor 518 to perform the operations of decision module 502. Thus, sequence controller 302 enables decision module 502 to select a mode for the ejection set sequencing, especially with regards to the components of subsystem 540.

In another example, data points 652A, 652B, and 652C also are shown. It may be appreciated that data point 652A is in mode 612 while data points 652B and 652C are in mode 614. Thus, voters 506-510 should return a first output 512 for mode 612, a second output 514 for mode 614, and a third output 516 for mode 614. Decision module 502 may select mode 614 except as modified by lookup table 524. In other words, lookup table 524 may inform decision module 502 to select mode 612, despite only data point 652A being in the mode.

Lookup table 524 may be stored in a database 522 accessible by decision module 502 and sequence controller 302. In some embodiments, the components of alternate ejection seat sequencing system 550 or ejection seat sequencing system 200, along with control system 300, may not be modified by a user. In other words, the components and code used to perform operations for these components, such as instructions 520, must be certified during manufacture or creation of the sequencing system. A user or pilot may not be able to modify decision module 502, modes 606-626, or any other component or the code used to operate or enable that component. Thus, a user may not make any adjustments to the timing delays implemented by the modes.

The disclosed embodiments, however, provide a solution whereby lookup table 524 is not code and does not need to be certified to be implemented with sequence controller 302. Lookup table 524 is configurable. Lookup table 524 provides fields for entries of a ranking of acceptable delay to modify or inform the selection process used by decision module 502. Lookup table 524 may be a distributed delay table to provide resolution control with increased precision. It also may reduce the hardest decisions to chose the safest mode by default.

Figure 7B:
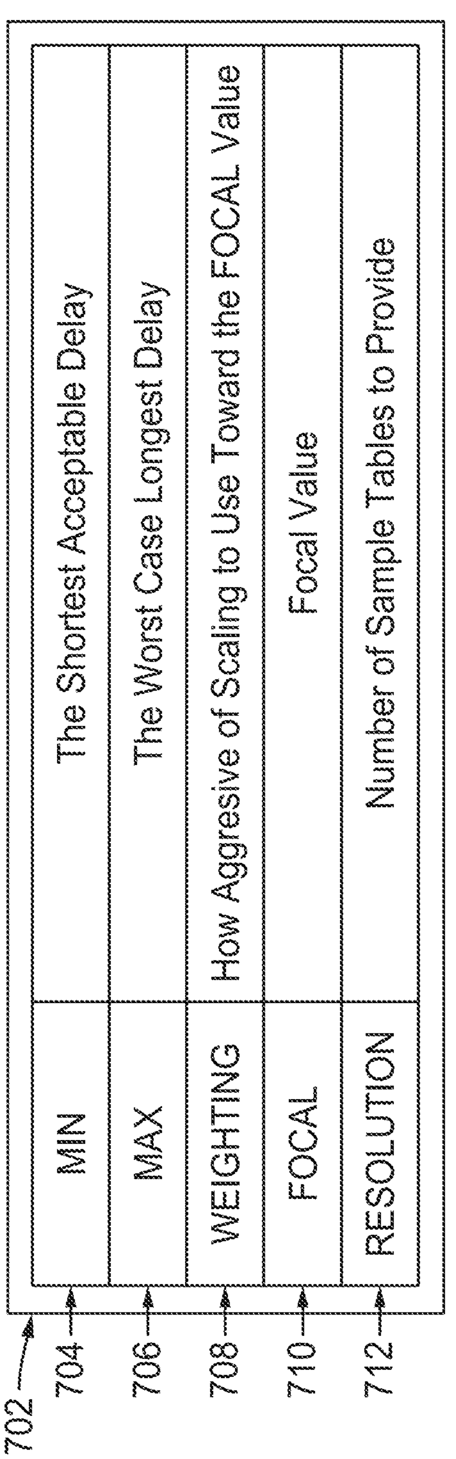
FIG. 7B illustrates an example configurable table according to the disclosed embodiments.

FIG. 7A depicts an example lookup table 524 according to the disclosed embodiments. FIG. 7B depicts an example configurable table 702 according to the disclosed embodiments. Lookup table 524 may be generating using configurable table 702. Configurable table 702 includes attributes that are used to generate the delay parameter values within lookup table 524. For each mode disclosed in chart 600, parameter value is provided for the time delay of a component of ejection seat sequencing system 200.

Each component may be listed in columns in lookup table 524. Components includes those disclosed in FIG. 5B. Each component also may have its own column with the values for the time delays for that component according to the respective mode. For example, column 724 for drogue 552, column 726 for STAPAC 554, column 728 for divergence thruster 556, column 730 for parachute mortar 558, column 732 for first drogue severance cutter 560, column 734 for second drogue severance cutter 562, and column 736 for harness release cartridge 562 may be shown in lookup table 524.

The rows in lookup table 524 may be separated by the sequence timing delay modes implemented by sequence controller 302. Thus, modes 606-626 include their own rows that includes the delay values to be used in the respective mode. After sequence controller 302 determines the appropriate mode, as disclosed above, the disclosed embodiments may go to lookup table 524 to the row matching the mode and pulls the delay values to be implemented by the sequence controller. Lookup table 524 may include any number of rows for any number of modes. For example, lookup table 524 may include modes 628-638 depending on the resolution specified in configurable table 702, disclosed in greater detail below.

The delay parameters in each row include a value for a time delay for the corresponding component. For example, in mode 612, drogue 552 in column 724 may have a time delay value of 0 ms. For mode 612, STAPAC 554 in column 726 may have a time delay value of 15 ms, divergence thruster 556 in column 728 may have a time delay value of 46 ms, parachute mortar 558 in column 730 may have a time delay value of 32 ms, first drogue severance cutter 560 in column 732 may have a time delay value of 500 ms, second drogue severance cutter 562 in column 734 may have a time delay value of 550 ms, and harness release cartridge 562 in column 736 may have a time delay value of 700 ms.

In some instances, the time delay values increase or stay the same between the different modes. For example, for mode 614, the time delay values for drogue 552, STAPAC 554, and divergency thruster 556 may remain the same as the values for mode 612. The time delay value for parachute mortar 558, however, may be 100 ms as opposed to 32 ms for mode 612. The time delay value for first drogue severance cutter 560 may be 600 ms as opposed to 500 ms for mode 612. The time delay value for second drogue severance cutter 562 may be 700 ms as opposed to 550 ms for mode 612. The time delay value for harness release cartridge 564 may be 1000 ms as opposed to 700 ms for mode 612.

In other instances, no action is taken by the respective component. For example, the time delay value for drogue 552 in mode 606 according to lookup table 524 may be "invalid" or "make inoperative." Moving to mode 608, the time delay value for drogue 552 also may be invalid. Moving to mode 610, the time delay value for drogue 552 also may be invalid.

As lookup table 524 moves further down columns for each mode, the time delay values increase as there is a delay between the activation of each component. Sequence controller 302 reads these values from lookup table 524. It knows to read a mode entry from lookup table 524. The modes may be an offset in the memory of database 522 having a specified number of delay values. In this instance, it may be 7 delay values shown in columns 724-736. Each delay value may be an integer that takes up 4 bytes of memory. Thus, reading an entry for a mode would mean sequence controller 302 would read 4*7, or 28, bytes at the offset for mode 614. These values would have a specified place in the memory of database 522, such as between bytes 17192 and 17220.

Further, as lookup table 524 moves to modes in an increasing order, the time delay values also may increase as the higher modes in chart 600 indicate greater airspeed and higher altitudes. These time delay values are configurable by the user for each mode using lookup table 524. Instead of situations where there is a large increase in time delay for a component from one mode to the next, the disclosed lookup table allows one to configure the difference in the times according to the user's wishes. One may use configurable table 702 to generate the time delay values for lookup table 524.

For example, configurable table 702 may include attributes that are set to generate the time delay values for the components. Min attribute 704 may refer to the shortest acceptable delay for activating a component. Max attribute 706 may refer to the worst case longest delay for activating a component. Weighting attribute 708 may refer to how aggressive of scaling to use toward the focal value, disclosed below. For example, weighting attribute 708 may specify to give or take 10% from the focal value. Focal attribute 710 may be the focal value for the component in the specified mode. The focal value may be the preferred value, or middle value, for the time delay.

Resolution attribute 712 may be the number of modes, or sample tables, to provide to the user to approve. A large resolution attribute 712 may indicate a large number of entries in lookup table 524 having finer differences between time delay values for the respective modes. For example, even though lookup table 524 shows entries for modes 606-626, this number may be expanded to entries 628-638 for finer resolution of time delay values used for the components.

For example, for STAPAC 554, configurable table 702 may include 15 ms for mix attribute 704, 15 ms for max attribute 706, 100 for weighting attribute 708, and 15 ms for focal attribute 710. The time delay value for STAPAC 554 in column 726 of lookup table 524 will be 15 ms because only 15 ms is specified in the min and max attributes. Weighting attribute 708 and focal attribute 710 have no real bearing on the time delay values in this column.

In another example, for parachute mortar 558, configurable table 702 may include 32 ms for min attribute 704, 800 ms for max attribute 706, 80 for weighting attribute 708, and 400 ms for focal attribute 710. The time delay values for the different modes may run from 32 ms to 800 ms with few values around each of these, but more values around focal attribute 710, or 400 ms.

In yet another example, for second drogue severance cutter 562, configurable table 702 may include 192 ms for min attribute 704, 1160 for max attribute 706, 10 for weighting attribute 708, and 1160 ms for focal attribute 710. The time delay values for second drogue severance cutter 562 in lookup table 524 may have a very distributed curve from 192 to 1160 ms but with most time delay values being closer to the higher end.

For blacking out certain values, such as using "invalid" or "make inoperative," the user may configure those values in lookup table 524. For example, the user would change the entries for the time delay values for the specific mode to not be operable. In some embodiments, configurable table 702 may not be able to make the use of a component inoperable.

Figure 8:
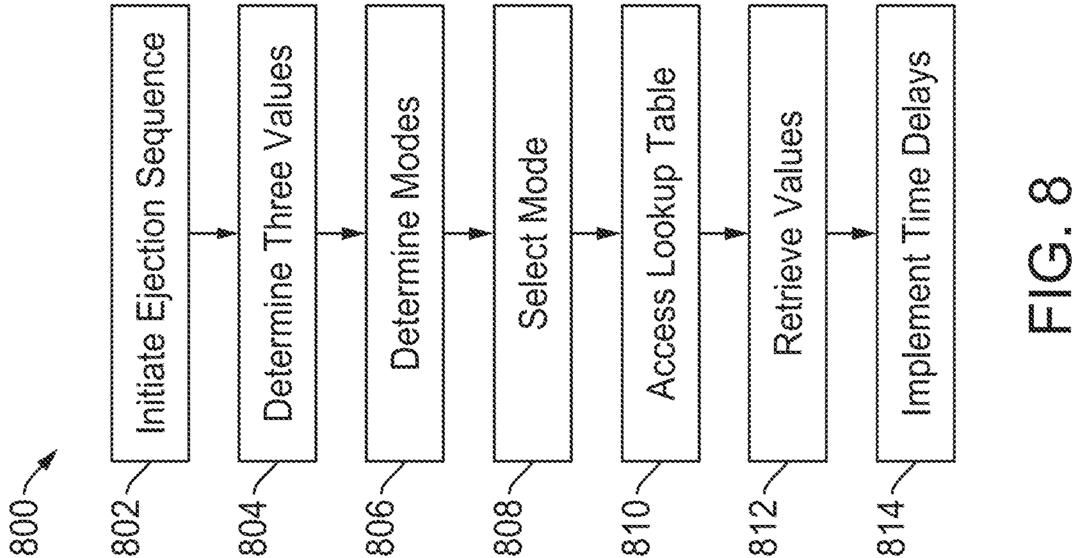
FIG. 8 illustrates a flowchart for performing ejection seat sequencing operations according to the disclosed embodiments.

FIG. 8 depicts a flowchart 800 for performing ejection seat sequencing operations according to the disclosed embodiments. Flowchart 800 may refer to FIGS. 1-7 for illustrative purposes. Flowchart 800, however, is not limited to the embodiments disclosed by FIGS. 1-7.

Step 802 executes by initiating an ejection sequence for ejection seat 14. Ejection seat 14 includes ejection seat sequencing system 200. Ejection seat sequencing system 200 will deploy a number of components for the ejection seat sequence. Step 804 executes by determining at least three values for a parameter using at least three sensors. Referring to FIG. 5A, first sensor 309A, second sensor 309B, and third sensor 309C provide a parameter, such as airspeed, to first voter 506, second voter 508, and third voter 510, respectively. Each voter generates a value, shown as outputs 512, 514, and 516 for decision module 502 of sequence controller 302.

Step 806 executes by determining a plurality of modes based on the outputs of the voters. Each output may specify a mode for ejection seat sequencing system 200 to implement. Modes are disclosed in FIG. 6. Decision module 502 may receive the determined mode from each voter. Step 808 executes by selecting a mode for the plurality of modes for implementation by sequence controller 302. In some instances, the outputs of the voters may not agree. For example, two outputs may indicate mode 614 while one output may indicate mode 612. Decision module 502 then may select mode 614 to be implemented.

Step 810 executes by accessing lookup table 524 based on the selected mode. Sequence controller 302 may refer to lookup table 524 for the time delay values for the time delays for the different components of ejection seat sequencing system 200. Step 812 executes by retrieving time delay values for delay parameters of the components in system 200 according to the selected mode. Step 814 executes by implementing the time delays for the components according to the values for the delay parameters in lookup table 524.

For example, decision module 502 may determine that mode 608 should be implemented by ejection seat sequencing system 200 based on the values for airspeed provided by sensors 309A, 309B, and 309C. Sequence controller 302 then accesses lookup table 524 to retrieve time delays values for the components listed in column 714. For example, the time delay value of BD is retrieved for parachute mortar 558. The value for BD may be 200 ms, which is then used for the time delay for deploying the parachute mortar.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. An ejection seat sequencing system for an ejection seat of an aircraft, the system comprising;
   - a sequence controller to issue time delay commands to at least one component; and
   - a database coupled to the sequence controller, wherein the database includes a lookup table,
   - wherein the sequence controller includes a processor coupled to a memory, wherein the memory includes instructions that, when executed on the processor, configures the sequence controller to perform the operations of
     - initiating an ejection sequence for the ejection seat;
     - determining at least two values for a parameter using at least two sensors;
     - determining a plurality of sequence timing delay modes based on the at least two values and a resolution attribute at the sequence controller, wherein each sequence timing delay mode includes a time delay for the at least one component of the ejection seat sequencing system;
     - selecting a sequence timing delay mode of the plurality of sequence timing delay modes at the sequence controller based on a weighting attribute and a focal attribute associated with each timing delay mode;
     - accessing the lookup table accessible by the sequence controller;
     - retrieving a value for a delay parameter in the lookup table; and implementing the time delay for the selected sequence time delay mode based on the delay parameter.

2. The ejection seat sequencing system of claim 1, wherein the at least one component includes at least one of a drogue parachute mortar, an advanced rocket motor and stability package, a divergence thruster, a parachute mortar, a drogue severance cutter, and a harness ridge cartridge.

3. The ejection seat sequencing system of claim 1, wherein the at least two sensors are pitot sensors.

4. The ejection seat sequencing system of claim 3, wherein the parameter detected by the at least two sensors is an airspeed of the ejection seat or the aircraft.

5. The ejection seat sequencing system of claim 1, further comprising a drogue parachute.

6. The ejection seat sequencing system of claim 1, further comprising a main parachute.

7. The ejection seat sequencing system of claim 1, wherein the sequence controller includes at least two voters, each voter receives a value of the at least two values for the parameter.

8. The ejection seat sequencing system of claim 7, wherein the voter recommends one of the sequence timing delay modes.

9. The ejection seat sequencing system of claim 1, wherein the at least two values include three or more values, and the at least two sensors includes three or more sensors.

10. A method for performing an ejection seat sequence, the method comprising:

initiating an ejection sequence for an ejection seat of an aircraft, wherein the ejection seat includes an ejection seat sequencing system;

determining at least two values for a parameter using at least two sensors;

determining a plurality of sequence timing delay modes based on the at least two values and a resolution attribute at a sequence controller, wherein each sequence timing delay mode includes a time delay for a component of the ejection seat sequencing system for the ejection seat;

selecting a sequence timing delay mode of the plurality of sequence timing delay modes at the sequence controller;

accessing a lookup table accessible by the sequence controller;

retrieving a value for a delay parameter in the lookup table based on a weighting attribute and a focal attribute associated with each timing delay mode; and implementing the time delay for the selected sequence time delay mode based on the delay parameter.

11. The method of claim 10, further comprising receiving an ejection command for the ejection seat of the aircraft.

12. The method of claim 10, wherein the at least two sensors are pitot sensors.

13. The method of claim 12, wherein the parameter is airspeed of the ejection seat or the aircraft detected by the at least three sensors.

14. The method of claim 10, wherein the delay parameter relates to deploying a drogue parachute or a main parachute for the ejection seat.

15. The method of claim 10, wherein the component of the ejection seat sequencing system includes at least one of a drogue parachute mortar, an advanced rocket motor and stability package, a divergence thruster, a parachute mortar, a drogue severance cutter, and a harness ridge cartridge.

16. The method of claim 10, wherein the at least two values for the parameter include three or more values, and the at least two sensors include three or more sensors.

17. A non-transitory computer-readable medium having stored thereon processor-executable instructions for performing operations comprising:

initiating an ejection sequence for an ejection seat of an aircraft, wherein the ejection seat includes an ejection seat sequencing system;

determining at least three values for a parameter using at least two sensors;

determining a plurality of sequence timing delay modes based on the at least two values and a resolution attribute at a sequence controller, wherein each sequence timing delay mode includes a time delay for a component of the ejection seat sequencing system for the ejection seat;

selecting a sequence timing delay mode of the plurality of sequence timing delay modes at the sequence controller based on a weighting attribute and a focal attribute associated with each timing delay mode;

accessing a lookup table accessible by the sequence controller;

retrieving a value for a delay parameter in the lookup table; and implementing the time delay for the selected sequence time delay mode based on the delay parameter.

18. The non-transitory computer-readable medium of claim 17, wherein the operations further include receiving an ejection command for the ejection seat of the aircraft.

19. The non-transitory computer-readable medium of claim 17, wherein the operations further include configuring the lookup table with a value for the delay parameter.

20. The non-transitory computer-readable medium of claim 17, wherein the component of the ejection seat sequencing system includes at least one of a drogue parachute mortar, an advanced rocket motor and stability package, a divergence thruster, a parachute mortar, a drogue severance cutter, and a harness ridge cartridge.

* * * * *